(12) United States Patent
Mesuda

(10) Patent No.: US 10,439,203 B2
(45) Date of Patent: Oct. 8, 2019

(54) METHOD OF PRODUCING AN ELECTRODE USING MIXTURES

(71) Applicant: TOYOTA JIDOSHA KABUSHIKI KAISHA, Toyota-shi, Aichi-ken (JP)

(72) Inventor: Tomoya Mesuda, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 87 days.

(21) Appl. No.: 15/709,857

(22) Filed: Sep. 20, 2017

(65) Prior Publication Data

US 2018/0102534 A1 Apr. 12, 2018

(30) Foreign Application Priority Data

Oct. 12, 2016 (JP) .................................. 2016-201013

(51) Int. Cl.
| | |
|---|---|
| *H01M 4/1391* | (2010.01) |
| *H01M 4/04* | (2006.01) |
| *H01M 4/62* | (2006.01) |
| *H01M 4/505* | (2010.01) |
| *H01M 4/525* | (2010.01) |
| *H01M 10/0525* | (2010.01) |

(52) U.S. Cl.
CPC ....... *H01M 4/1391* (2013.01); *H01M 4/0404* (2013.01); *H01M 4/0409* (2013.01); *H01M 4/624* (2013.01); *H01M 4/505* (2013.01); *H01M 4/525* (2013.01); *H01M 4/625* (2013.01); *H01M 10/0525* (2013.01)

(58) Field of Classification Search
CPC ............... H01M 4/0404; H01M 4/139; H01M 2004/021; H01M 4/62
See application file for complete search history.

(56) References Cited

U.S. PATENT DOCUMENTS

| | | | | |
|---|---|---|---|---|
| 2008/0257718 | A1* | 10/2008 | Chiang | ................... F03G 7/005 204/242 |
| 2010/0261066 | A1* | 10/2010 | Nagata | ................ H01M 4/0428 429/246 |
| 2011/0168550 | A1* | 7/2011 | Wang | .................. H01M 4/0419 204/290.12 |

(Continued)

FOREIGN PATENT DOCUMENTS

| | | |
|---|---|---|
| JP | 11-307099 A | 11/1999 |
| JP | 2011-181229 A | 9/2011 |

(Continued)

*Primary Examiner* — Imran Akram
(74) *Attorney, Agent, or Firm* — Sughrue Mion, PLLC

(57) ABSTRACT

An electrode production method by which an electrode including an electrode active material layer formed on a surface of a current collecting member is produced includes, when a material having a lower bulk density between an electrode active material and a conductive material is used as a first substance and a material having a higher bulk density is used as a second substance, wetting the first substance with a solvent to prepare a wet substance, performing first mixing in which the wet substance and the second substance are mixed to prepare a preceding mixture, and performing second mixing in which the preceding mixture, a binder, and the solvent are mixed and granulated to prepare a wet granulated substance.

2 Claims, 4 Drawing Sheets

(56) References Cited

U.S. PATENT DOCUMENTS

| | | | |
|---|---|---|---|
| 2012/0070736 A1* | 3/2012 | Ohara | H01M 4/13 429/211 |
| 2012/0328942 A1* | 12/2012 | Thomas-Alyea | H01M 4/587 429/211 |
| 2013/0017340 A1* | 1/2013 | Brown | H01M 4/0404 427/458 |
| 2014/0106257 A1* | 4/2014 | Raychaudhuri | C01B 32/168 429/521 |
| 2015/0236344 A1* | 8/2015 | Ramaswamy | H01M 4/386 429/156 |
| 2015/0280221 A1* | 10/2015 | Abdelsalam | H01M 4/133 429/217 |
| 2015/0340731 A1* | 11/2015 | Kim | H01M 10/052 429/94 |
| 2016/0049637 A1* | 2/2016 | Sohn | H01M 4/13 429/231.95 |
| 2016/0118657 A1* | 4/2016 | Horie | C01G 23/04 429/231.1 |
| 2016/0204434 A1 | 7/2016 | Uezono et al. | |
| 2016/0211504 A1 | 7/2016 | Uezono et al. | |
| 2016/0315311 A1* | 10/2016 | Jeon | H01M 4/366 |
| 2017/0229711 A1* | 8/2017 | Yamakawa | H01M 10/0525 |

FOREIGN PATENT DOCUMENTS

| | | |
|---|---|---|
| JP | 2016-91850 A | 5/2016 |
| JP | 2016-131092 A | 7/2016 |
| JP | 2016-134269 A | 7/2016 |

\* cited by examiner

METHOD OF PRODUCING AN ELECTRODE USING MIXTURES

INCORPORATION BY REFERENCE

The disclosure of Japanese Patent Application No. 2016-201013 filed on Oct. 12, 2016 including the specification, drawings and abstract is incorporated herein by reference in its entirety.

BACKGROUND

1. Technical Field

The present disclosure relates to a method of producing an electrode included in a battery.

2. Description of Related Art

Japanese Patent Application Publication No. 2016-131092 (JP 2016-131092 A) discloses an electrode production method in which an electrode including an electrode active material layer on a surface of a current collecting member is produced. Specifically, the electrode production method includes a wet granulated substance preparation process in which an electrode active material, a conductive material, a binder, and a solvent are mixed and granulated to prepare a wet granulated substance, a film forming process in which the wet granulated substance prepared in the wet granulated substance preparation process is adhered in a film form to a surface of the current collecting member, and a drying process in which the film form wet granulated substance adhered to the surface of the current collecting member is dried and the electrode active material layer is formed on the surface of the current collecting member.

In the above, the wet granulated substance preparation process includes a first mixing process in which an electrode active material and a conductive material are mixed (dried and mixed) to prepare a preceding mixture and a second mixing process in which the preceding mixture, the binder, and the solvent are mixed and granulated to prepare the wet granulated substance.

SUMMARY

Incidentally, in general, there is a difference in bulk density between the electrode active material and the conductive material. Here, when a material having a lower bulk density between the electrode active material and the conductive material serves as a first substance and a material having a higher bulk density serves as a second substance, in the first mixing process in JP 2016-131092 A, when the electrode active material and the conductive material are mixed (dried and mixed), the second substance having a higher bulk density is unevenly distributed downward (sedimented). On the other hand, the first substance having a lower bulk density tends to be unevenly distributed upward, and it is difficult to uniformly mix (disperse) both substances. Therefore, in the preceding mixture prepared in the first mixing process, the dispersibility (degree of dispersion) of the electrode active material and the conductive material becomes lower (thus the dispersibility of the conductive material with respect to the electrode active material becomes lower), and the electrical resistivity of the preceding mixture tends to increase (thus the electrical resistivity of the electrode active material layer increases).

The present disclosure provides an electrode production method through which it is possible to prevent an increase in electrical resistivity of a preceding mixture prepared by mixing an electrode active material with a conductive material.

According to an aspect of the present disclosure, there is provided an electrode production method by which an electrode including an electrode active material layer formed on a surface of a current collecting member is produced, including: mixing and granulating an electrode active material, a conductive material, a binder, and a solvent to prepare a wet granulated substance; adhering the prepared wet granulated substance in a film form to the surface of the current collecting member and forming a film; drying the film form wet granulated substance adhered to the surface of the current collecting member to form the electrode active material layer on the surface of the current collecting member; when the electrode active material, the conductive material, the binder, and the solvent are mixed and granulated to prepare the wet granulated substance, preparing a wet substance obtained by wetting a first substance with the solvent; performing first mixing in which the wet substance and a second substance are mixed to prepare a preceding mixture; and performing second mixing in which the preceding mixture, the binder, and the solvent are mixed and granulated to prepare the wet granulated substance, wherein, between the electrode active material and the conductive material, a material having a lower bulk density is used as the first substance and a material having a higher bulk density is used as the second substance.

In the above production method, before the first mixing in which a preceding mixture is prepared, the first substance which is a material having a lower bulk density between the electrode active material and the conductive material is wetted (to the extent that surfaces are wetted) with the solvent (some of the entire solvent used to prepare the wet granulated substance) to prepare a wet substance. Then, in the first mixing, the second substance which is a material having a higher bulk density between the electrode active material and the conductive material and the prepared wet substance are mixed to prepare the preceding mixture. Then, in the second mixing, the preceding mixture, the binder, and the solvent (the remainder of the solvent excluding the solvent used in the wet process within the entire solvent used to prepare the wet granulated substance) are mixed and granulated to prepare the wet granulated substance.

As described above, in the first mixing, when the second substance which is a material having a higher bulk density between the electrode active material and the conductive material and the prepared wet substance (a substance in which the first substance which is a material having a lower bulk density between the electrode active material and the conductive material is wetted with the solvent) are mixed, it is possible to mix the second substance and the wet substance (the first substance) while the wet substance (the first substance wetted with the solvent) is adhered (bonded using the solvent) to the surface of the second substance. Alternatively, it is possible to mix the second substance and the wet substance (the first substance) while the second substance is adhered (bonded using the solvent) to the surface of the wet substance (the first substance wetted with the solvent).

Therefore, in the preceding mixture prepared in the first mixing, the dispersibility (degree of dispersion) of the electrode active material and the conductive material becomes favorable (thus the dispersibility of the conductive material with respect to the electrode active material becomes favorable). In other words, the electrode active material and the conductive material are favorably mixed throughout the preceding mixture. Therefore, since it is possible to form a favorable conductive network with the conductive material throughout the preceding mixture, it is possible to prevent an increase in electrical resistivity of the preceding mixture.

Here, the wet granulated substance is a granular material substance in which the solvent is retained (absorbed) in the binder together with particles of the electrode active material and particles of the conductive material, and then these are combined (bonded).

Furthermore, in the electrode production method, the first substance may be the conductive material, the second substance may be the electrode active material, the conductive material may have a bulk density that is in a range of 0.02 to 0.2 (g/cc), and when the first substance is wetted with the solvent to prepare the wet substance, the amount of the solvent added per 1 g (gram) of the conductive material may be in a range of 0.5 to 3 g.

In the above production method, the first substance may be the conductive material, and the second substance may be the electrode active material. That is, a material having a lower bulk density between the electrode active material and the conductive material may be the conductive material, and a material having a higher bulk density may be the electrode active material. Therefore, when the first substance is wetted with the solvent to prepare the wet substance, the conductive material is wetted (to the extent that surfaces are wetted) with the solvent to prepare the wet conductive material. Then, in the first mixing, the electrode active material and the wet conductive material (wet substance) are mixed to prepare the preceding mixture.

Therefore, it is possible to mix the electrode active material and the wet conductive material while the wet conductive material is adhered (bonded using the using solvent) to the surface of the electrode active material. Therefore, in the preceding mixture prepared in the first mixing, the dispersibility (degree of dispersion) of the electrode active material and the conductive material becomes favorable (thus the dispersibility of the conductive material with respect to the electrode active material becomes favorable).

In the above production method, a conductive material having a bulk density in a range of 0.02 to 0.2 (g/cc) may be used as the conductive material. Further, when the first substance is wetted with the solvent to prepare the wet substance, the amount of the solvent added per 1 g (grams) of the conductive material may be in a range of 0.5 to 3 g (grams). In other words, when the first substance is wetted with the solvent to prepare the wet substance, the solvent is added in a proportion in a range of 0.5 to 3 g with respect to 1 g of the conductive material. That is, when the first substance is wetted with the solvent to prepare the wet substance, the mixing ratio between the conductive material and the solvent is set to 1: "a value in a range of 0.5 to 3" by weight ratio.

Accordingly, in the first mixing, the dispersibility (degree of dispersion) of the electrode active material and the conductive material can become more favorable (thus the dispersibility of the conductive material with respect to the electrode active material can become more favorable). Therefore, in the preceding mixture prepared in the first mixing, the degree of dispersion of the electrode active material and the conductive material can become more favorable (thus the degree of dispersion of the conductive material with respect to the electrode active material can become more favorable), and it is possible to further prevent an increase in electrical resistivity of the preceding mixture.

In the above production method, the first substance may be the electrode active material, and the second substance may be the conductive material. That is, between the electrode active material and the conductive material, a material having a lower bulk density may be the electrode active material and a material having a higher bulk density may be the conductive material.

In the above production method, the wet granulated substance has a solid component proportion that may be in a range of 70 to 84 wt %.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
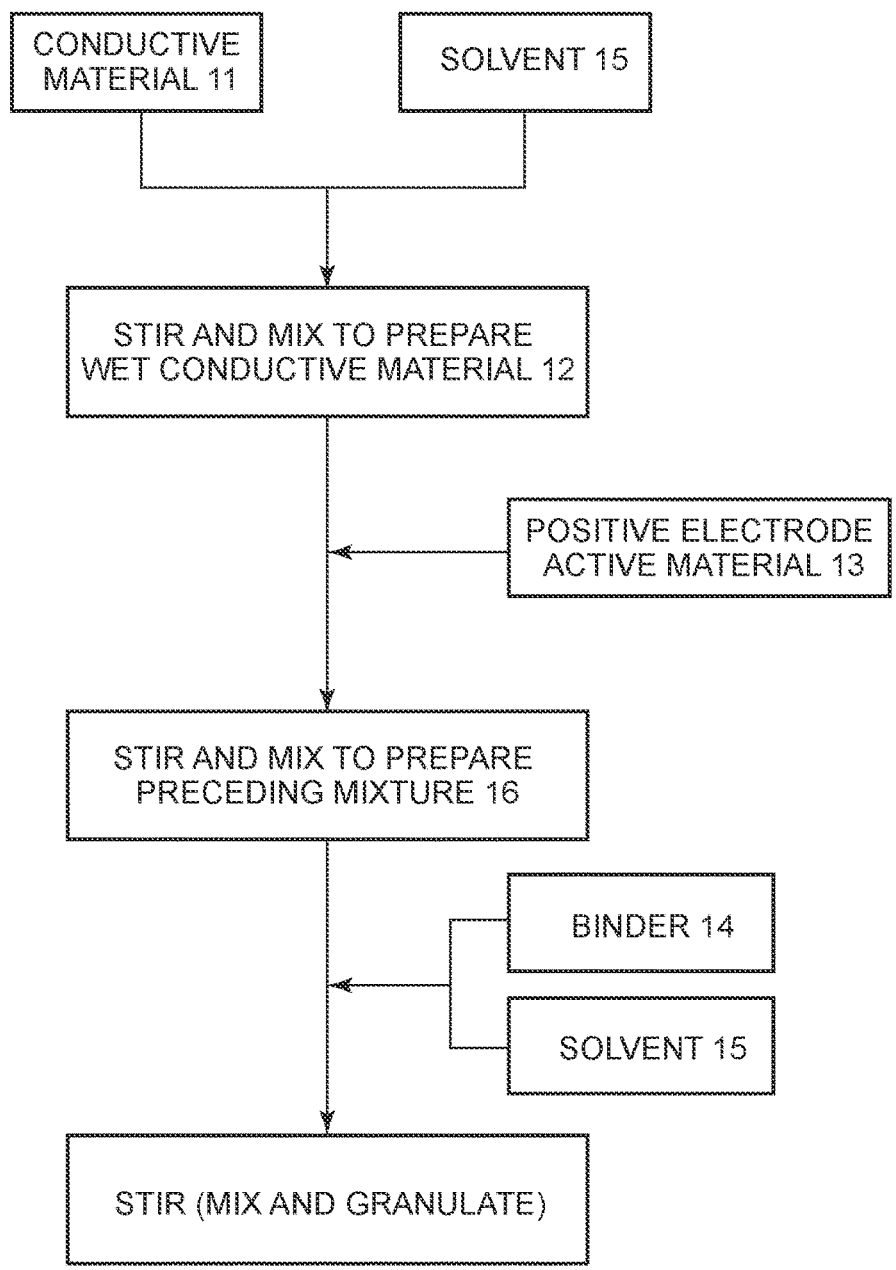
FIG. 1 is a schematic diagram showing a wet granulated substance preparing procedure according to an embodiment.

Specific embodiments of the present disclosure will be described below in detail with reference to the appended drawings. The present embodiment relates to production of a positive electrode (electrode) of a lithium ion secondary battery. In the present embodiment, as materials of a wet granulated substance in order to form a positive electrode active material layer (an electrode active material layer) of the positive electrode, a positive electrode active material (the electrode active material), a conductive material, a binder, and a solvent are used.

Here, in the present embodiment, as a positive electrode active material 13, a powdered lithium transition metal composite oxide (specifically, $LiNi_{1/3}Mn_{1/3}Co_{1/3}O_2$) is used. In addition, powdered acetylene black is used as a conductive material 11. In addition, PVdF (polyvinylidene fluoride) is used as a binder 14. In addition, NMP (N-methyl pyrrolidone) is used as a solvent 15.

In the present embodiment, the above materials are kneaded to prepare a wet granulated substance 6. The wet granulated substance 6 is adhered (applied) in a film form to a surface of a current collecting foil 7 (a current collecting member). Then, the wet granulated substance 6 on the surface of the current collecting foil 7 is dried to produce a positive electrode 19. That is, in the present embodiment, a wet granulated substance preparation process in which the wet granulated substance 6 is prepared, a film forming process in which the wet granulated substance 6 is adhered in a film form to a surface of the current collecting foil 7, and a drying process in which the film form wet granulated substance 6 adhered to the surface of the current collecting foil 7 is dried are performed to produce the positive electrode 19.

Figure 2:
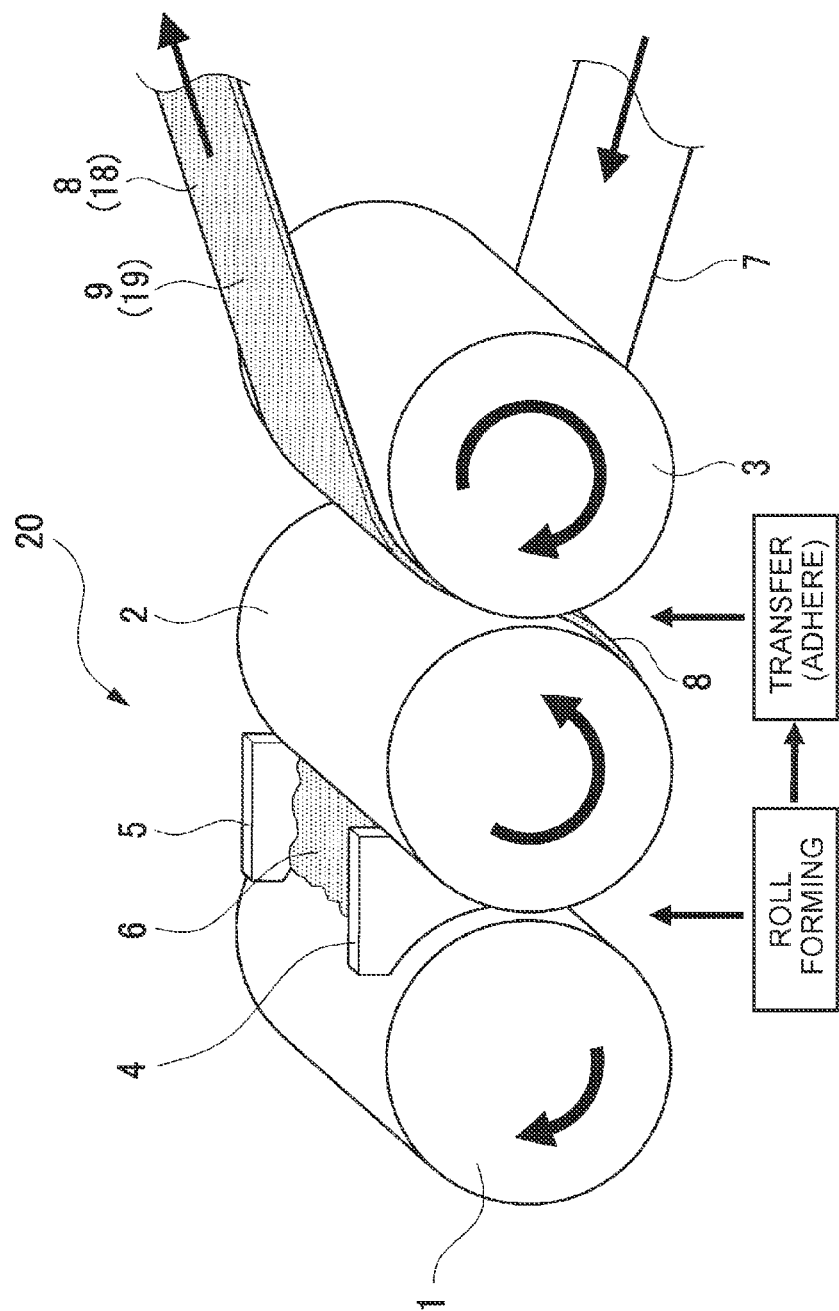
FIG. 2 is a perspective view describing a configuration of a roll film forming device used in the embodiment.
Figure 3:
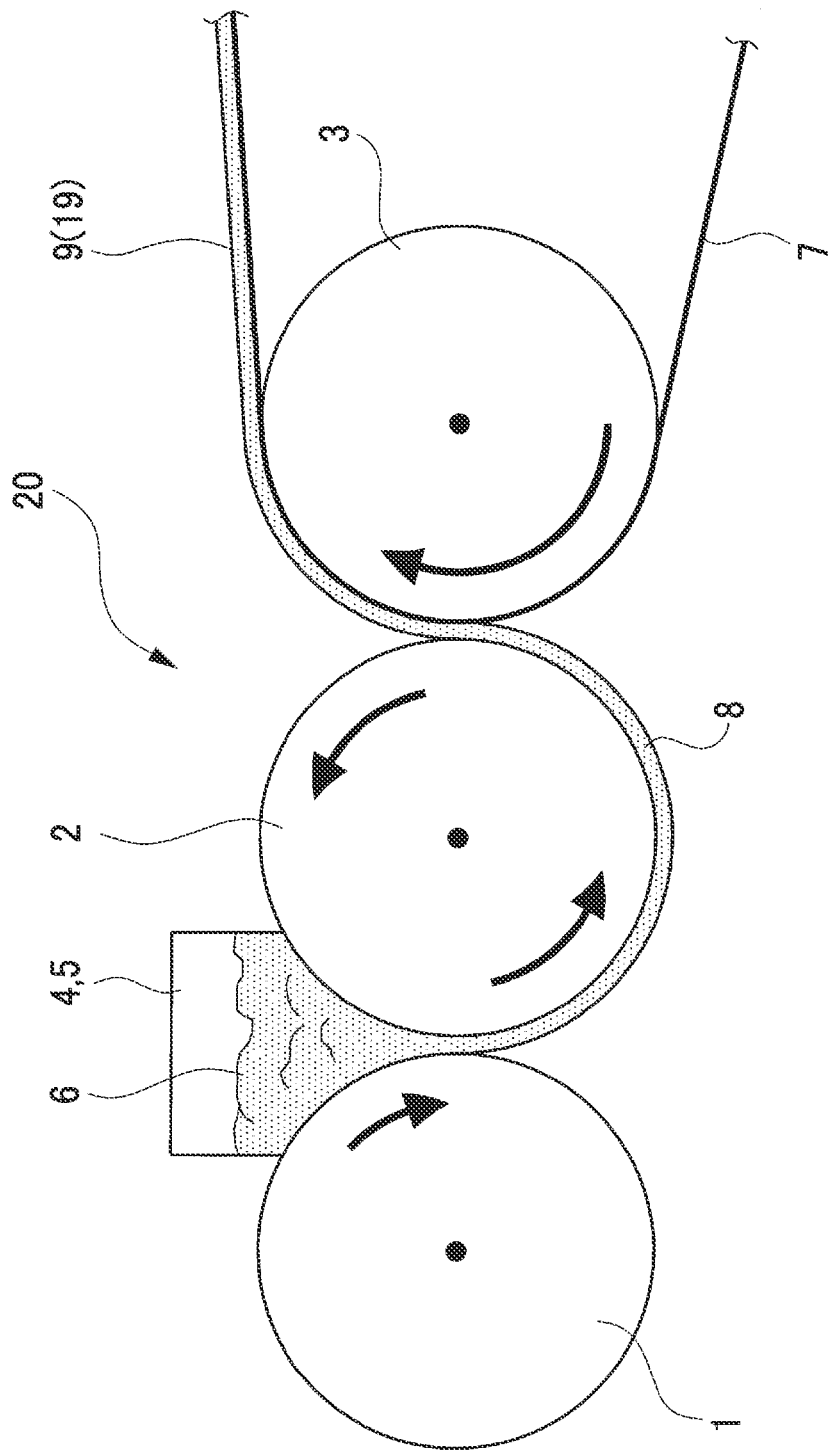
FIG. 3 is a cross-sectional view of the roll film forming device in FIG. 2.
Figure 4:
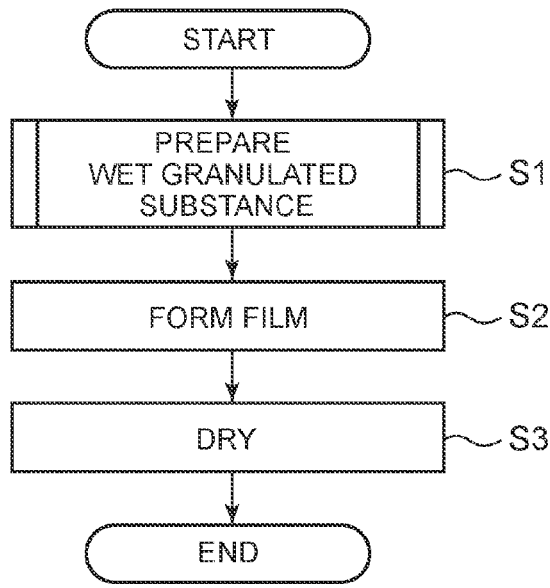
FIG. 4 is a flowchart showing the flow of an electrode production method according to an embodiment.
Figure 5:
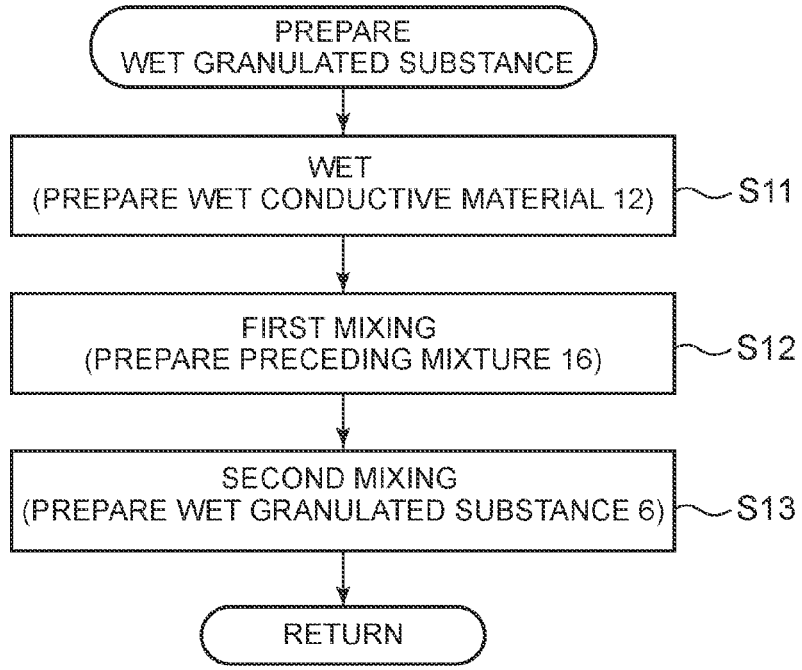
FIG. 5 shows subroutines of the flowchart in FIG. 4.

Here, the electrode (the positive electrode 19) production method according to the present embodiment will be described in detail. FIG. 1 is a schematic diagram showing a procedure of preparing the wet granulated substance 6 according to the embodiment. FIG. 2 is a perspective view describing a configuration of a roll film forming device 20 used in the embodiment. FIG. 3 is a cross-sectional view of the roll film forming device 20 in FIG. 2. FIG. 4 is a flowchart showing the flow of a method of producing the electrode (the positive electrode 19) according to the embodiment. FIG. 5 shows subroutines of the flowchart in FIG. 4 and is a flowchart showing the flow of a method of producing the wet granulated substance 6.

As shown in FIG. 4, first, in Step S1 (the wet granulated substance preparation process), the positive electrode active material 13 ($LiNi_{1/3}Mn_{1/3}Co_{1/3}O_2$), the conductive material 11 (acetylene black), the binder 14 (PVdF), and the solvent 15 (NMP) are mixed and granulated to prepare the wet granulated substance 6. Here, the powdered positive electrode active material 13 (electrode active material) used in the present embodiment has a bulk density of 1.5 g/cc. In addition, the powdered conductive material 11 used in the present embodiment has a bulk density in a range of 0.01 to 0.25 g/cc. Therefore, in the present embodiment, between the positive electrode active material 13 and the conductive material 11, a first substance α which is a material having a lower bulk density is the conductive material 11 and a second substance β which is a material having a higher bulk density is the positive electrode active material 13.

Here, the method of preparing the wet granulated substance 6 of the present embodiment will be described in detail. As shown in FIG. 5, first, in Step S11 (a wet process), a wet conductive material 12 (wet substance) in which the conductive material 11 (the first substance α) is wetted with the solvent 15 is prepared. Specifically, the powdered conductive material 11 and the solvent 15 (some of the entire solvent 15 used to prepare the wet granulated substance 6) are supplied into and stirred in a known stirring granulator (not shown), and particles of the conductive material 11 are wetted with the solvent 15 (to the extent that surfaces of the particles of the conductive material 11 are wetted) to prepare the wet conductive material 12 (wet substance) (refer to FIG. 1).

Next, the process advances to Step S12 (a first mixing process). The wet conductive material 12 (wet substance) prepared in Step S11 and the positive electrode active material 13 (the second substance β) are mixed to prepare a preceding mixture 16. Specifically, the powdered positive electrode active material 13 is added and stirred in the above stirring granulator in which the wet conductive material 12 is accommodated, and the positive electrode active material 13 and the wet conductive material 12 are mixed (dispersed) into the preceding mixture 16 (refer to FIG. 1).

As described above, in Step S12 (the first mixing process), when the positive electrode active material 13 (the second substance β) which is a material having a higher bulk density between the positive electrode active material 13 (electrode active material) and the conductive material 11, and the wet conductive material 12 (wet substance in which the conductive material 11 which is the first substance α that is a material having a lower bulk density between the positive electrode active material 13 and the conductive material 11 is wetted with the solvent 15) prepared in the previous Step S11 (the wet process) are mixed, it is possible to mix (disperse) the positive electrode active material 13 (the second substance β) and the conductive material 11 (the first substance α) while the wet conductive material 12 (the first substance α wetted with the solvent 15) is adhered (bonded using the solvent 15) to surfaces of particles of the positive electrode active material 13 (the second substance β).

Therefore, in the preceding mixture 16 prepared in Step S12 (the first mixing process), the dispersibility (degree of dispersion) of the positive electrode active material 13 (electrode active material) and the conductive material 11 becomes favorable (thus the dispersibility of the conductive material 11 with respect to the positive electrode active material 13 becomes favorable). In other words, the positive electrode active material 13 (electrode active material) and the conductive material 11 are appropriately (favorably) mixed throughout the preceding mixture 16. Therefore, since it is possible to form a favorable conductive network with the conductive material 11 throughout the preceding mixture 16, it is possible to prevent an increase in electrical resistivity of the preceding mixture 16.

Next, the process advances to Step S13 (a second mixing process). The preceding mixture 16 obtained by mixing the wet conductive material 12 with the positive electrode active material 13, the binder 14 (PVdF), and the solvent 15 (NMP) are mixed and granulated to prepare the wet granulated substance 6. Specifically, the binder 14 (PVdF) and the solvent 15 (the remainder of the solvent 15 excluding the solvent 15 used in Step S11 within the entire solvent 15 used to prepare the wet granulated substance 6) are added to and stirred in the above stirring granulator in which the preceding mixture 16 is included to prepare the wet granulated substance 6 (refer to FIG. 1).

In the mixing in Step S13 (the second mixing process), all of the components of the wet granulated substance 6 are mixed. When all of the components are mixed, the wet granulated substance 6 is obtained. Here, when the above Step S12 (the first mixing process) and Step S13 (the second mixing process) are performed, the powdered positive electrode active material 13 is granulated and the positive electrode active material 13 have particles (wet particles) whose sizes are larger than those of the original powder. The wet granulated substance 6 is a granular substance substance in which the solvent 15 is retained (absorbed) in the binder 14 together with particles of the positive electrode active material 13, and particles of the conductive material 11, and then these are combined (bonded).

In addition, in the present embodiment, the mixing ratio between the components mixed in Step S11 (the wet process), Step S12 (the first mixing process), and Step S13 (the second mixing process) is as follows. First, in Step S11 (the wet process), the mixing ratio between the conductive material 11 (acetylene black) and the solvent 15 (NMP) is set to 1: "a value in a range of 0.3 to 4" by weight ratio. In addition, in Step S12 (the first mixing process), the positive electrode active material 13 is added so that the mixing ratio (combining ratio) between the positive electrode active material 13 ($LiNi_{1/3}Mn_{1/3}Co_{1/3}O_2$) and the conductive material 11 is 96:4 by weight ratio.

In addition, in Step S13 (the second mixing process), the binder 14 is added so that the proportion by weight of the binder 14 in all of the solid components including the positive electrode active material 13, the conductive material 11, and the binder 14 (PVdF) is 3%. Further, the solvent 15 (NMP) is added so that NV (a solid component proportion) of the wet granulated substance 6 is 78% by proportion by weight. Specifically, components other than the solvent 15, that is, the positive electrode active material 13, the conductive material 11, and the binder 14 are solid components (nonvolatile components). The total weight of these components is 78 wt % with respect to the total weight of the wet granulated substance 6 (the total weight of the positive electrode active material 13, the conductive material 11, the binder 14, and the solvent 15).

Next, the process advances to Step S2 (the film forming process). The wet granulated substance 6 prepared in Step S1 (the wet granulated substance preparation process) is adhered in a film form to a surface of the current collecting foil 7 (a current collecting member). Specifically, the wet granulated substance 6 prepared in Step S1 (the wet granulated substance preparation process) passes through a gap between rollers that face each other (a first roller 1 and a second roller 2) and is then formed into a film. The wet granulated substance 6 formed into a film is adhered to the surface of the current collecting foil 7 (refer to FIG. 2 and FIG. 3). Here, in the present embodiment, Step S2 (the film forming process) is performed using the roll film forming device 20 shown in FIG. 2 and FIG. 3.

As shown in FIG. 2 and FIG. 3, the roll film forming device 20 includes three rollers: the first roller 1, the second roller 2 and a third roller 3. These three rollers 1 to 3 are disposed horizontally and provided parallel to each other. In addition, the first roller 1 and the second roller 2 are disposed to face each other with a slight interval therebetween. Similarly, the second roller 2 and the third roller 3 are disposed to face each other with a slight interval therebetween. The first roller 1 and the third roller 3 do not face each other. Furthermore, on the upper side of a part in which the first roller 1 and the second roller 2 face each other, partition plates 4 and 5 are disposed to be separated in a width direction (axial direction, a direction orthogonal to the plane of paper in FIG. 3) of the roller.

In addition, as indicated by arrows in FIG. 2 and FIG. 3, the directions of rotation of these three rollers 1 to 3 are set such that the directions of rotation of two adjacent (facing) rollers are opposite to each other, that is, two facing rollers rotate forward. Here, in a part in which the first roller 1 and the second roller 2 face each other, surfaces of these rollers are set to move downward due to rotation. In addition, in a part in which the second roller 2 and the third roller 3 face each other, surfaces of these rollers are set to move upward due to rotation. In addition, the rotational speed is set so that a moving speed of a surface of the first roller 1 due to rotation is slowest, that of the third roller 3 is fastest, and that of the second roller 2 is between those two.

In the roll film forming device 20, the wet granulated substance 6 prepared in Step S1 is supplied into a housing space between the partition plates 4 and 5 positioned on the part in which the first roller 1 and the second roller 2 face each other. In addition, the current collecting foil 7 is wrapped around the third roller 3. The current collecting foil 7 is a metal foil (an aluminum foil), and passes through the part in which the second roller 2 and the third roller 3 face each other when the third roller 3 rotates and is transferred from the lower right to the upper right in FIG. 2 and FIG. 3. In addition, a slight gap is additionally provided between the second roller 2 and the current collecting foil 7 in the part in which the second roller 2 and the third roller 3 face each other while the current collecting foil 7 is passed through. That is, a gap (a gap when the current collecting foil 7 is not provided) between the second roller 2 and the third roller 3 is slightly wider than the thickness of the current collecting foil 7.

In Step S2 (the film forming process), the wet granulated substance 6 prepared in Step S1 is supplied into the housing space between the partition plates 4 and 5 of the roll film forming device 20. The supplied wet granulated substance 6 is provided into the gap of the part in which the first roller 1 and the second roller 2 face each other, and passes through the gap between both rollers when the first roller 1 and the second roller 2 rotate, and is formed into a film (refer to FIG. 3).

The wet granulated substance 6 formed into a film (this is called a wet granulated substance film 8) is then supported on the surface of the second roller 2 whose moving speed is higher than the first roller 1, and transferred when the second roller 2 rotates. Then, the current collecting foil 7 and the wet granulated substance film 8 meet at the part in which the second roller 2 and the third roller 3 face each other. Therefore, the wet granulated substance film 8 is transferred (adhered) from the second roller 2 to the surface of the current collecting foil 7 that is rotating together with the third roller 3 having a higher moving speed. Accordingly, a current collecting foil having a wet granulated substance film 9 in which the wet granulated substance film 8 is formed on the current collecting foil 7 is obtained.

Then, the process advances to Step S3 (the drying process). The current collecting foil having a wet granulated substance film 9 is dried (the wet granulated substance film 8 is dried). Therefore, the solvent 15 absorbed (retained) in the wet granulated substance film 8 (the wet granulated substance 6) is removed (evaporated), and the wet granulated substance film 8 becomes a positive electrode active material layer 18 (electrode active material layer) (refer to FIG. 2). Therefore, the positive electrode 19 including the positive electrode active material layer 18 on the surface of the current collecting foil 7 is obtained. Here, the wet granulated substance film 8 (the positive electrode active material layer 18) may be formed on only one surface of the current collecting foil 7 or formed on both surfaces thereof.

The prepared positive electrode 19 is then combined with a negative electrode and a separator to form an electrode body. Next, a terminal member is attached to the electrode body. Then, the electrode body and an electrolyte solution are accommodated in a battery case. Therefore, a lithium ion secondary battery is completed.

EXAMPLES 1 TO 8

In Examples 1 to 8, the processes of Step S11 to S12 were performed in the same manner except that acetylene black having a different bulk density was used as the conductive material 11 to prepare the preceding mixture 16 (refer to Table 1). Specifically, in Example 1, powdered acetylene black having a bulk density of 0.01 g/cc was used as the conductive material 11. In Example 2, powdered acetylene black having a bulk density of 0.02 g/cc was used as the conductive material 11. In Example 3, powdered acetylene black having a bulk density of 0.05 g/cc was used as the conductive material 11.

In Example 4, powdered acetylene black having a bulk density of 0.08 g/cc was used as the conductive material 11. In Example 5, powdered acetylene black having a bulk density of 0.1 g/cc was used as the conductive material 11. In Example 6, powdered acetylene black having a bulk density of 0.15 g/cc was used as the conductive material 11. In Example 7, powdered acetylene black having a bulk density of 0.2 g/cc was used as the conductive material 11. In Example 8, powdered acetylene black having a bulk density of 0.25 g/cc was used as the conductive material 11.

Here, in all of Examples 1 to 8, in Step S11 (the wet process), the mixing ratio between the conductive material 11 (acetylene black) and the solvent 15 (NMP) was set to 1:1 by weight ratio, and the conductive material 11 was wetted with the solvent 15 to prepare the wet conductive material 12

(refer to Table 1). In addition, in all of Examples 1 to 8, in Step S12 (the first mixing process), the rotational speed of the stirring granulator (not shown) was set to 4500 rpm, and the positive electrode active material 13 and the wet conductive material 12 were mixed to prepare the preceding mixture 16. In addition, in all of Examples 1 to 8, the mixing ratio between the positive electrode active material 13 and the conductive material 11 was set to 96:4 by weight ratio.

TABLE 1

| | Bulk density of conductive material (g/cc) | Amount of solvent per 1 g of conductive material (g) | Evaluation of electrical resistivity of preceding mixture |
|---|---|---|---|
| Example 1 | 0.01 | 1 | Good |
| Example 2 | 0.02 | 1 | Very good |
| Example 3 | 0.05 | 1 | Very good |
| Example 4 | 0.08 | 1 | Very good |
| Example 5 | 0.1 | 1 | Very good |
| Example 6 | 0.15 | 1 | Very good |
| Example 7 | 0.2 | 1 | Very good |
| Example 8 | 0.25 | 1 | Good |
| Comparative Example 1 | 0.01 | — | Poor |
| Comparative Example 2 | 0.02 | — | Poor |
| Comparative Example 3 | 0.05 | — | Poor |
| Comparative Example 4 | 0.08 | — | Poor |
| Comparative Example 5 | 0.1 | — | Poor |
| Comparative Example 6 | 0.15 | — | Poor |
| Comparative Example 7 | 0.2 | — | Poor |
| Comparative Example 8 | 0.25 | — | Poor |

COMPARATIVE EXAMPLES 1 TO 8

Unlike Examples 1 to 8, in Comparative Examples 1 to 8, the process of Step S11 (the wet process) was not performed, and the positive electrode active material 13 and the conductive material 11 were mixed (dried and mixed) to prepare a preceding mixture. Bulk densities of the conductive materials 11 used in Comparative Examples 1 to 8 are shown in Table 1. Here, in Comparative Examples 1 to 8, as in Examples 1 to 8, the rotational speed of the stirring granulator (not shown) was set to 4500 rpm, and the positive electrode active material 13 and the conductive material 11 were mixed to prepare a preceding mixture. In addition, in all of Comparative Examples 1 to 8, as in Examples 1 to 8, the mixing ratio between the positive electrode active material 13 and the conductive material 11 was set to 96:4 by weight ratio.

(Evaluation test of electrical resistivity of preceding mixture) The electric resistivities of the preceding mixtures of Examples 1 to 8 and Comparative Examples 1 to 8 were measured. Here, in this test, a powder resistance measurement system (commercially available from Mitsubishi Chemical Analytech Co., Ltd.) was used to measure the electrical resistivity (Ω·cm) of the preceding mixtures under a pressure of 12 kN (while a load of 12 kN was applied to the preceding mixture serving as a measurement subject). Here, in this test, when the electrical resistivity was 8 Ω·cm or less, this was evaluated as "very good." When the electrical resistivity became higher than 8 Ω·cm and 12 Ω·cm or less, this was evaluated as "good." When the electrical resistivity became higher than 12 Ω·cm and 16 Ω·cm or less, this was evaluated as "slightly poor." When the electrical resistivity became higher than 16 Ω·cm, this was evaluated as "poor." The results are shown in Table 1.

As shown in Table 1, in all of the preceding mixtures in Comparative Examples 1 to 8, the electrical resistivity became higher than 16 Ω·cm. The reason why the electrical resistivity increased as described above is speculated to be as follows.

There was a difference in bulk density between the positive electrode active material 13 ($LiNi_{1/3}Mn_{1/3}Co_{1/3}O_2$) and the conductive material 11 (acetylene black) constituting the preceding mixture. Specifically, the bulk density of the positive electrode active material 13 was 1.5 g/cc. On the other hand, while the bulk densities of the conductive material 11 all differed in Comparative Examples 1 to 8, they was in a range of 0.01 to 0.25 g/cc and were considerably lower than the bulk density of the positive electrode active material 13 (it was a value of ⅙ of the bulk density of the positive electrode active material 13 or less).

For this reason, when the preceding mixture was prepared, if the positive electrode active material 13 and the conductive material 11 were mixed (dried and mixed), the positive electrode active material 13 (the second substance β) having a higher bulk density was unevenly distributed downward (sedimented), whereas the conductive material 11 (the first substance α) having a lower bulk density tended to be unevenly distributed upward. It was not possible to uniformly mix (disperse) the positive electrode active material 13 with the conductive material 11. As a result, in the prepared preceding mixture, it is thought that the dispersibility (degree of dispersion) of the positive electrode active material 13 and the conductive material 11 became lower (thus the dispersibility of the conductive material 11 with respect to the positive electrode active material 13 became lower), it was not possible to form a favorable conductive network with the conductive material 11, and the electrical resistivity of the preceding mixture increased (thus the electrical resistivity of the positive electrode active material layer 18 increased).

On the other hand, in the preceding mixtures 16 in all of Examples 1 to 8, the electrical resistivity was reduced to 12 Ω·cm or less (specifically, 10 Ω·cm or less). The reason why the electrical resistivity became lower than in Comparative Examples 1 to 8 as described above is speculated to be as follows.

In Examples 1 to 8, before the first mixing process in which a preceding mixture was prepared, the wet process in which the conductive material 11 (the first substance α) that was a material having a lower bulk density between the positive electrode active material 13 and the conductive material 11 was wetted (to the extent that surfaces of particles of the conductive material 11 were wetted) with the solvent 15 (a part of the total amount of the solvent 15 used to prepare the wet granulated substance 6) to prepare the wet conductive material 12 was provided. Then, in the first mixing process, the positive electrode active material 13 (the second substance β) that was a material having a higher bulk density between the positive electrode active material 13 and the conductive material 11, and the wet conductive material 12 prepared in the previous wet process were mixed to prepare a preceding mixture.

Therefore, in the first mixing process, when the positive electrode active material 13 (the second substance β) that was a material having a higher bulk density between the positive electrode active material 13 and the conductive material 11 and the wet conductive material 12 (wet substance in which the conductive material 11 that was a material having a lower bulk density between the positive electrode active material 13 and the conductive material 11 was wetted with the solvent 15) prepared in the previous wet process were mixed, while the wet conductive material 12 was adhered to surfaces of particles of the positive electrode active material 13 (that is, the conductive material 11 was bonded to surfaces of particles of the positive electrode active material 13 using the solvent 15), it was possible to mix (disperse) the positive electrode active material 13 and the conductive material 11. Therefore, unlike Comparative Examples 1 to 8, in the first mixing process, it is possible to prevent "the positive electrode active material 13 (the second substance β) having a higher bulk density from being unevenly distributed (sedimented) downward and the conductive material 11 (the first substance α) having a lower bulk density from being unevenly distributed upward."

Therefore, in Examples 1 to 8, in the preceding mixtures 16 prepared in the first mixing process, the dispersibility (degree of dispersion) of the positive electrode active material 13 and the conductive material 11 was favorable (thus the dispersibility of the conductive material 11 with respect to the positive electrode active material 13 was favorable). In other words, the positive electrode active material 13 (electrode active material) and the conductive material 11 were favorably mixed throughout the preceding mixture 16. Therefore, it was thought that a favorable conductive network could be formed throughout the preceding mixture 16 with the conductive material 11, and the electrical resistivity of the preceding mixture 16 became lower than in Comparative Examples 1 to 8 (thus the electrical resistivity of the positive electrode active material layer 18 can become lower).

Next, the electric resistivities of the preceding mixtures 16 of Examples 1 to 8 were compared. Among Examples 1 to 8, in Examples 2 to 7, the electric resistivities of the preceding mixtures 16 were 8 Ω·cm or less. On the other hand, in Examples 1 and 8, the electric resistivities of the preceding mixtures 16 had a value in a range of higher than 8 Ω·cm and 12 Ω·cm or less (specifically a value in a range of 9 to 10 Ω·cm), and became higher than in Examples 2 to 7.

The reason why the electric resistivities of the preceding mixtures of Examples 1 and 8 had a value higher than the electrical resistivity of the preceding mixtures of Examples 2 to 7 as described above is speculated to be as follows. Specifically, in Example 1, the conductive material 11 having a low bulk density at 0.01 g/cc was used as the conductive material. As described above, it was thought that, since the conductive material 11 having a low bulk density (thus lightweight) was used, in Example 1, the conductive material 11 was wetted with the solvent 15 to prepare the wet conductive material 12 in Step S11 (the wet process), and then, in Step S12 (the first mixing process), when the wet conductive material 12 and the positive electrode active material 13 were mixed, the dispersibility (degree of dispersion) of the wet conductive material 12 became lower (specifically, was likely to be unevenly distributed upward) than in Examples 2 to 7 (in which conductive materials had a higher bulk density than in Example 1). Therefore, it is thought that the electrical resistivity of the preceding mixture became higher than in Examples 2 to 7.

In addition, in Example 8, the conductive material 11 having a high bulk density of 0.25 g/cc was used as the conductive material. Therefore, in Step S11 (the wet process), when the conductive material 11 was wetted with the solvent 15 to prepare the wet conductive material 12, particles of the conductive material 11 were more likely to aggregate using the solvent 15 (the wet conductive material 12 was likely to aggregate) than in Examples 2 to 7 (in which conductive materials had a lower bulk density than in Example 8). Therefore, in Step S12 (the first mixing process), it is thought that when the wet conductive material 12 and the positive electrode active material 13 were mixed, the dispersibility (degree of dispersion) of the wet conductive material 12 became lower and the electrical resistivity of the preceding mixture became higher than in Examples 2 to 7.

On the other hand, in Examples 2 to 7, the conductive material 11 having a bulk density in a range of 0.02 to 0.2 (g/cc) was used as the conductive material. It is thought that when the conductive material 11 having a bulk density in this range was used, in Step S11 (the wet process), particles of the conductive material 11 were less likely to aggregate (the wet conductive material 12 was less likely to aggregate), using the solvent 15, and in Step S12 (the first mixing process), the dispersibility (degree of dispersion) of the wet conductive material 12 was favorable. As a result, in Examples 2 to 7, it is thought that the electrical resistivity of the preceding mixture 16 was 8 Ω·cm or less.

Based on the above results, the bulk density of the conductive material 11 was preferably in a range of 0.02 to 0.2 (g/cc). That is, when the first substance α (a material having a lower bulk density between the electrode active material and the conductive material) was the conductive material, a conductive material having a bulk density value in a range of 0.02 to 0.2 (g/cc) was preferably used as the conductive material.

EXAMPLES 9 TO 14

In Examples 9 to 14, in Step S11 (the wet process), the amount of the solvent 15 added differed (that is, the amount of the solvent 15 added per 1 g of the conductive material 11 differed) when preparing the wet conductive material 12, which was different from the other examples. In addition, among Examples 9 to 14, only in Example 14, in Step S12 (the first mixing process), the rotational speed of the stirring granulator (not shown) differed when preparing the preceding mixture 16, which was different from the other examples. Except for these differences, the processes of Step S11 to S12 were performed in the same manner to prepare the preceding mixture 16 (refer to Table 2).

Here, in all of Examples 9 to 14, powdered acetylene black having a bulk density of 0.1 g/cc was used as the conductive material 11. In addition, in Examples 9 to 13, the rotational speed of the stirring granulator (not shown) in Step S12 (the first mixing process) was set to 4500 rpm. Meanwhile, only in Example 14, in Step S12 (the first mixing process), the rotational speed of the stirring granulator (not shown) was set to 2000 rpm (refer to Table 2). In addition, in all of Examples 9 to 14, in Step S12 (the first mixing process), the mixing ratio between the positive electrode active material 13 and the conductive material 11 was set to 96:4 by weight ratio.

TABLE 2

| | Bulk density of conductive material (g/cc) | Amount of solvent per 1 g of conductive material (g) | Rotational speed of stirring granulator (rpm) | Evaluation of electrical resistivity of preceding mixture |
|---|---|---|---|---|
| Example 9 | 0.1 | 0.3 | 4500 | Good |
| Example 10 | 0.1 | 0.5 | 4500 | Very good |

TABLE 2-continued

|  | Bulk density of conductive material (g/cc) | Amount of solvent per 1 g of conductive material (g) | Rotational speed of stirring granulator (rpm) | Evaluation of electrical resistivity of preceding mixture |
|---|---|---|---|---|
| Example 11 | 0.1 | 2 | 4500 | Very good |
| Example 12 | 0.1 | 3 | 4500 | Very good |
| Example 13 | 0.1 | 4 | 4500 | Good |
| Example 14 | 0.1 | 1 | 2000 | Very good |

As shown in Table 2, in Example 9, in Step S11 (the wet process), the amount of the solvent 15 added per 1 g (gram) of the conductive material 11 was set to 0.3 g (grams) (that is, the mixing ratio between the conductive material 11 and the solvent 15 was set to 1:0.3 by weight ratio) to prepare the wet conductive material 12. In addition, in Example 10, in Step S11 (the wet process), the amount of the solvent 15 added per 1 g of the conductive material 11 was set to 0.5 g (that is, the mixing ratio between the conductive material 11 and the solvent 15 was set to 1:0.5 by weight ratio) to prepare the wet conductive material 12.

In addition, in Example 11, in Step S11 (the wet process), the amount of the solvent 15 added per 1 g of the conductive material 11 was set to 2 g (that is, the mixing ratio between the conductive material 11 and the solvent 15 was set to 1:2 by weight ratio) to prepare the wet conductive material 12. In addition, in Example 12, in Step S11 (the wet process), the amount of the solvent 15 added per 1 g of the conductive material 11 was set to 3 g (that is, the mixing ratio between the conductive material 11 and the solvent 15 was set to 1:3 by weight ratio) to prepare the wet conductive material 12.

In addition, in Example 13, in Step S11 (the wet process), the amount of the solvent 15 added per 1 g of the conductive material 11 was set to 4 g (that is, the mixing ratio between the conductive material 11 and the solvent 15 was set to 1:4 by weight ratio) to prepare the wet conductive material 12. In addition, in Example 14, in Step S11 (the wet process), the amount of the solvent 15 added per 1 g of the conductive material 11 was set to 1 g (that is, the mixing ratio between the conductive material 11 and the solvent 15 was set to 1:1 by weight ratio) to prepare the wet conductive material 12.

The electric resistivities of the preceding mixtures 16 in Examples 9 to 14 were measured in the same manner as in the preceding mixtures 16 in Examples 1 to 8. Then, similarly to the evaluation test of the electrical resistivity described above, when the electrical resistivity became 8 Ω·cm or less, this was evaluated as "very good." When the electrical resistivity became higher than 8 Ω·cm and 12 Ω·cm or less, this was evaluated as "good." When the electrical resistivity became higher than 12 Ω·cm and 16 Ω·cm or less, this was evaluated as "slightly poor." When the electrical resistivity became higher than 16 Ω·cm, this was evaluated as "poor. The results are shown in Table 2.

As shown in Table 2, among Examples 9 to 13, in Examples 10 to 12, the electric resistivities of the preceding mixtures 16 were 8 Ω·cm or less. On the other hand, in Examples 9 and 13, the electric resistivities of the preceding mixtures 16 had a value in a range of higher than 8 Ω·cm and 12 Ω·cm or less, which was higher than in Examples 10 to 12.

The reason why the electric resistivities of the preceding mixtures in Examples 9 and 13 had a value higher than the electric resistivities of the preceding mixtures in Examples 10 to 12 as described above is speculated to be as follows.

In Example 9, in Step S11 (the wet process), the amount of the solvent 15 added per 1 g of the conductive material 11 was reduced to 0.3 g (that is, the mixing ratio between the conductive material 11 and the solvent 15 was set to 1:0.3 by weight ratio) to prepare the wet conductive material 12. It is thought that, when the amount of the solvent 15 added per 1 g of the conductive material 11 was reduced in this manner, the conductive material 11 in Example 9 was in a less wet state than in Examples 10 to 12 (in which the amount of the solvent 15 added was larger than in Example 9) (it was not possible to sufficiently spread the solvent 15 throughout the conductive material 11 added).

As a result, in Example 9, it is thought that, in Step S12 (the first mixing process), when the wet conductive material 12 and the positive electrode active material 13 were mixed, the wet conductive material 12 was less likely to adhere to the positive electrode active material 13 and the dispersibility (degree of dispersion) of the wet conductive material 12 became lower than in Examples 10 to 12. Therefore, it is thought that the electrical resistivity of the preceding mixture became higher than in Examples 10 to 12.

In addition, in Example 13, in Step S11 (the wet process), the amount of the solvent 15 added per 1 g of the conductive material 11 was increased to 4 g (that is, the mixing ratio between the conductive material 11 and the solvent 15 was set to 1:4 by weight ratio) to prepare the wet conductive material 12. It is thought that, when the amount of the solvent 15 added per 1 g of the conductive material 11 increased in this manner, particles of the conductive material 11 were more likely to aggregate using the solvent 15 in Example 13 (the wet conductive material 12 was likely to aggregate) than in Examples 10 to 12 (the amount of the solvent 15 added was smaller than in Example 13). Therefore, it is thought that, in Step S12 (the first mixing process), when the wet conductive material 12 and the positive electrode active material 13 were mixed, the dispersibility (degree of dispersion) of the wet conductive material 12 became lower and the electrical resistivity of the preceding mixture became higher than in Examples 10 to 12.

On the other hand, in Examples 10 to 12, in Step S11 (the wet process), the amount of the solvent added per 1 g of the conductive material was set in a range of 0.5 to 3 g. In other words, in the wet process, the solvent was added in a proportion in a range of 0.5 to 3 g with respect to 1 g of the conductive material. That is, in the wet process, the mixing ratio between the conductive material 11 and the solvent 15 was set to 1: "a value in a range of 0.5 to 3" by weight ratio. Therefore, in Step S11 (the wet process), it is thought that it was possible prevent particles of the conductive material 11 from aggregating using the solvent 15 (the wet conductive material 12 was prevented from aggregating) and the conductive material 11 was in a favorable wet state (it was possible to sufficiently spread the solvent 15 throughout the added conductive material 11). As a result, in Examples 10 to 12, it is thought that the electrical resistivity of the preceding mixture 16 was 8 Ω·cm or less.

Based on the above results, in the wet process, the amount of the solvent added per 1 g of the conductive material was preferably in a range of 0.5 to 3 g. In other words, in the wet process, the solvent was preferably added in a proportion in a range of 0.5 to 3 g with respect to 1 g of the conductive material. That is, in the wet process, the mixing ratio between the conductive material and the solvent was preferably 1: "a value in a range of 0.5 to 3" by weight ratio.

In addition, the results of Example 5 and Example 14 were compared. In Example 5 and Example 14, the preceding mixtures 16 were prepared in the same manner except that the rotational speed of the stirring granulator (not shown) in Step S12 (the first mixing process) was different. Specifically, in Example 5, the rotational speed of the stirring granulator was set to 4500 rpm in Step S12 (the first mixing process) (refer to Table 1), and set to 2000 rpm in Example 14 (refer to Table 2).

In this manner, in Example 14, regardless of the rotational speed of the stirring granulator that was set to be lower than in Example 5 (specifically, ½ of the rotational speed of Example 5 or less) to prepare the preceding mixture 16, the electrical resistivity of the preceding mixture 16 was lower to 8 Ω·cm or less as in Example 5. As a result, regardless of the rotational speed of the stirring granulator (not shown) in Step S12 (the first mixing process), before Step S12 (the first mixing process), the conductive material 11 (the first substance α) having a lower bulk density between the positive electrode active material 13 and the conductive material 11 was wetted (to the extent that surfaces of particles of the conductive material 11 were wetted) with the solvent 15 (a part of the total amount of the solvent 15 used to prepare the wet granulated substance 6) to prepare the wet conductive material 12. Thus, it is thought that, in the first mixing process, when the positive electrode active material 13 (the second substance β) having a higher bulk density between the positive electrode active material 13 and the conductive material 11 and the wet conductive material 12 prepared in the previous wet process were mixed to prepare the preceding mixture, the electrical resistivity of the preceding mixture 16 could be lowered.

It can be understood that, while the embodiments of the present disclosure have been described above, the present disclosure is not limited to the embodiments, and can be appropriately changed and applied without departing from the spirit and scope of the disclosure.

For example, in the embodiments, the method of producing a positive electrode has been described as the electrode production method according to the present disclosure. However, the present disclosure may be applied for a method of producing a negative electrode.

In addition, a case in which a material having a lower bulk density (the first substance α) between the electrode active material and the conductive material is the conductive material and a material having a higher bulk density (the second substance β) is the electrode active material has been exemplified in the embodiments. However, the present disclosure can also be applied to a case in which a material having a lower bulk density (the first substance α) between the electrode active material and the conductive material is the electrode active material and a material having a higher bulk density (the second substance β) is the conductive material. In this case, in the wet process, the electrode active material (the first substance α) is wetted with the solvent to prepare a wet electrode active material (wet substance). Then, in the first mixing process, the wet electrode active material (wet substance) and the conductive material (the second substance β) are mixed to prepare the preceding mixture. Therefore, it is possible to mix (disperse) the electrode active material and the conductive material while surfaces of particles of the wet electrode active material are adhered (bonded using the solvent) to the conductive material. Accordingly, in the preceding mixture, the dispersibility (degree of dispersion) of the electrode active material and the conductive material became favorable (thus the dispersibility of the conductive material with respect to the electrode active material becomes favorable), and the electrical resistivity of the preceding mixture can be lowered.

In addition, in the embodiments, in Step S13 (the second mixing process), the solvent 15 (NMP) was added so that NV (a solid component proportion) of the wet granulated substance 6 was 78% by proportion by weight. That is, the solid component proportion of the wet granulated substance 6 was set to 78 wt %. However, the solid component proportion of the prepared wet granulated substance is not limited to this value. However, the solid component proportion of the wet granulated substance is preferably in a range of 70 to 84 wt %. When the solid component proportion is set in this range, in the following Step S2 (the film forming process), it is possible to appropriately form the wet granulated substance as a film on the surface of the current collecting member and it is possible to dry the film of the wet granulated substance in a short time in Step S3 (the drying process).

What is claimed is:

1. A method of producing an electrode included in a battery by which an electrode including an electrode active material layer formed on a surface of a current collecting member is produced, comprising:
    wetting a first substance with a solvent to obtain a wet substance;
    mixing the wet substance and a second substance to prepare a preceding mixture;
    mixing and granulating the preceding mixture, a binder, and a solvent to prepare a wet granulated substance;
    adhering the prepared wet granulated substance in a film form to the surface of the current collecting member and forming a film; and
    drying the film form wet granulated substance adhered to the surface of the current collecting member to form the electrode active material layer on the surface of the current collecting member, wherein:
    the first substance is a conductive material,
    the second substance is an electrode active material,
    the conductive material has a bulk density that is in a range of 0.02 to 0.2 g/cc,
    when the first substance is wetted with the solvent to prepare the wet substance, an amount of the solvent added per 1 g of the conductive material is in a range of 0.5 to 3 g, and
    the first substance has a lower bulk density than the bulk density of the second substance.

2. The method according to claim 1, wherein the wet granulated substance has a solid component proportion that is in a range of 70 to 84 wt %.

* * * * *